US012662035B2

(12) United States Patent
Cho

(10) Patent No.: US 12,662,035 B2
(45) Date of Patent: Jun. 23, 2026

(54) DEVICE FOR ADJUSTING HEADREST FOR VEHICLES

(71) Applicant: HYUNDAI TRANSYS INC., Seosan-si (KR)

(72) Inventor: Jae Hoon Cho, Hwaseong-si (KR)

(73) Assignee: HYUNDAI TRANSYS INC., Seosan-si (KR)

( * ) Notice: Subject to any disclaimer, the term of this patent is extended or adjusted under 35 U.S.C. 154(b) by 197 days.

(21) Appl. No.: 18/396,858

(22) Filed: Dec. 27, 2023

(65) Prior Publication Data

US 2024/0217416 A1     Jul. 4, 2024

(30) Foreign Application Priority Data

Jan. 3, 2023     (KR) ........................ 10-2023-0000724

(51) Int. Cl.
B60N 2/885          (2018.01)
B60N 2/806          (2018.01)
B60N 2/879          (2018.01)

(52) U.S. Cl.
CPC ............. B60N 2/885 (2018.02); B60N 2/806 (2018.02); B60N 2/879 (2018.02)

(58) Field of Classification Search
CPC ................................ B60N 2/885; B60N 2/879
See application file for complete search history.

(56) References Cited

U.S. PATENT DOCUMENTS

| | | | | |
|---|---|---|---|---|
| 6,744,898 B1 * | 6/2004 | Hirano | ................... | H04R 5/023 |
| | | | | 381/301 |
| 10,239,432 B2 * | 3/2019 | Subat | ................... | B60R 11/0217 |
| 10,279,718 B2 * | 5/2019 | Hayashi | ................... | A47C 7/38 |
| 11,413,988 B2 * | 8/2022 | Samain | ................... | F16H 25/20 |
| 11,584,276 B2 * | 2/2023 | Soltner | ................... | B60N 2/879 |
| 12,162,390 B2 * | 12/2024 | Yu | ................... | B60N 2/853 |
| 2009/0309346 A1 * | 12/2009 | Van Druff | ............... | B60R 22/26 |
| | | | | 280/806 |

FOREIGN PATENT DOCUMENTS

| | | | | | |
|---|---|---|---|---|---|
| CN | 112706672 A | * | 4/2021 | ............. | B60N 2/879 |
| CN | 113263967 A | * | 8/2021 | ............. | B60N 2/885 |
| CN | 113859077 A | * | 12/2021 | ............. | B60N 2/853 |

(Continued)

OTHER PUBLICATIONS

Request for Submission of an Opinion dated Jan. 9, 2025 in Korean Patent Application No. 10-2023-0000724.

(Continued)

*Primary Examiner* — Timothy J Brindley
(74) *Attorney, Agent, or Firm* — Quantum Patent Law Firm; Seongyoune Kang

(57) ABSTRACT
A device is provided for adjusting a headrest for vehicles. The device includes a headrest unit connected to a vehicle seat and including a driving unit, a pair of side headrest units disposed on left and right sides of the headrest unit, respectively, and configured to be selectively rotated, and a pair of link units configured to respectively connect the pair of side headrest units to the headrest unit and to be operated by the driving unit to rotate the pair of side headrest units within a predetermined rotation adjustment range with respect to the headrest unit.

11 Claims, 16 Drawing Sheets

(56)     References Cited

FOREIGN PATENT DOCUMENTS

| | | | | | |
|---|---|---|---|---|---|
| CN | 215322150 | U | 12/2021 | | |
| CN | 217917702 | U | 11/2022 | | |
| CN | 116587949 | A * | 8/2023 | ............ | B60N 2/879 |
| DE | 20016359 | U1 * | 11/2001 | ............ | B60N 2/882 |
| FR | 3114274 | A1 * | 3/2022 | ............ | B60N 2/885 |
| JP | 2005-58287 | A | 3/2005 | | |
| KR | 1020090047671 | B1 | 5/2009 | | |
| KR | 2013-0071181 | A | 6/2013 | | |
| KR | 10-2015-0077502 | A | 7/2015 | | |

OTHER PUBLICATIONS

Written Decision on Registration dated Aug. 14, 2025 from Korea Application No. 10-2023-000724.

* cited by examiner

DEVICE FOR ADJUSTING HEADREST FOR VEHICLES

CROSS-REFERENCE TO RELATED APPLICATION

This application under 35 U.S.C. § 119(a) claims the priority to Korean Patent Application No. 10-2023-0000724, filed on Jan. 3, 2023, the entire contents of which are incorporated herein by reference.

BACKGROUND

(a) Technical Field

The present disclosure relates to a device for adjusting a headrest for vehicles. More particularly, it relates to a device for adjusting a headrest for vehicles, which enables an occupant to rotate side headrests connected to left and right sides of a headrest to his or her desired angle within a predetermined rotation adjustment range, thereby providing comfortable seating feeling to the occupant.

(b) Background Art

In general, a vehicle seat, which is mounted in a vehicle in order to help an occupant travel comfortably to a destination, includes a headrest, a seatback, and a seat cushion. A headrest is a part mounted to a top of a seatback, which supports an occupant's back, in order to support an occupant's head. In particular, a headrest functions to prevent injury to an occupant's neck due to vehicle collision and to keep an occupant's head comfortable.

Such a headrest, on which an occupant can rest his or her head, may prevent injury to the neck or relieve fatigue of the neck during a long drive, but has a shortcoming that it is impossible or difficult for an occupant to comfortably sleep in a state of leaning his or her head against the headrest during relaxation or to drive a vehicle in a comfortable state.

When driving a long distance or driving at night, a driver may desire to sleep with his or her back and head leaned against a seat in order to relieve fatigue. However, because a conventional headrest does not reliably support the head, the driver sleeps with his or her neck tilted, and thus suffers from neck strain and pain.

In order to solve this problem, research has recently been conducted to improve a headrest, for example, such that a portion of the headrest on which an occupant's neck is rested is formed so as to protrude or such that the headrest is mounted so as to be rotatable forward to a predetermined angle.

In the case in which a lower portion of the headrest on which an occupant's neck is rested is formed so as to protrude, the occupant may feel comfortable during relaxation. However, because the protruding portion is maintained in a fixed state, this may interfere with driving.

In addition, in the case of rotating the headrest forward, the occupant's neck may be maintained in a tilted state for a long time, which may cause pain in the neck. Further, because the occupant's head is not fixed by the headrest, the occupant may feel uncomfortable.

The above information disclosed in this Background section is only for enhancement of understanding of the background of the device, and therefore it may contain information that does not form the related art that is already known in this country to a person of ordinary skill in the art.

SUMMARY OF THE DISCLOSURE

The present device has been made in an effort to solve the above-described problems associated with the related art, and it is an object of the present disclosure to provide a device for adjusting a headrest for vehicles, which is equipped with a pair of link mechanisms configured to be adjusted in coupling angle by operation of a driving motor connected thereto, thereby selectively rotating side headrests connected to left and right sides of a headrest to a desired angle within a predetermined rotation adjustment range, thus reliably supporting an occupant's head and providing comfortable seating feeling to the occupant.

In one aspect, the present disclosure provides a device for adjusting a headrest for vehicles, which includes a headrest unit connected to a vehicle seat and including a driving unit, a pair of side headrest units disposed on left and right sides of the headrest unit, respectively, and configured to be selectively rotated, and a pair of link units configured to respectively connect the pair of side headrest units to the headrest unit and to be operated by the driving unit to rotate the pair of side headrest units within a predetermined rotation adjustment range with respect to the headrest unit.

In a preferred embodiment, each of the pair of link units may include a first guide link configured to move in a width direction of the headrest unit when the driving unit is driven and a second guide link configured to continuously rotate along with movement of the first guide link to guide a corresponding one of the pair of side headrest units to be rotated from an initial position thereof and to face a remaining one of the pair of side headrest units.

In another preferred embodiment, the second guide link may include an inner link configured to rotate along with movement of the first guide link and including a bent portion bent in an L-shape so as to be connected to the corresponding one of the pair of side headrest units and an outer link including a bent portion bent in an L-shape to connect the corresponding one of the pair of side headrest units to the headrest unit. The bent portion of the outer link and the bent portion of the inner link are axially coupled to each other such that the outer link and the inner link cross each other and the outer link is rotated by the inner link.

In still another preferred embodiment, the inner link may include one end portion extending from the bent portion so as to be connected to the first guide link and another end portion extending from the bent portion, one end portion of the inner link having a longer length from the bent portion than the other end portion of the inner link, and the outer link may include one end portion extending from the bent portion so as to be connected to the headrest unit and another end portion extending from the bent portion, one end portion of the outer link having a shorter length from the bent portion than the other end portion of the outer link.

In yet another preferred embodiment, as the first guide link moves, the inner link and the outer link of the second guide link may rotate in opposite directions about the respective bent portions thereof.

In still yet another preferred embodiment, the headrest unit may include a center coupling part provided with a rail member to guide movement of the first guide link and configured to allow one end of the outer link to be rotatably connected thereto and a lifting guide configured to ascend or descend along with rotation of a lead screw provided at the driving unit to guide the first guide link to move in the width direction of the headrest unit.

In a further preferred embodiment, the lifting guide may include a main body coupled to the lead screw so as to ascend and descend and a frame member mounted to the main body and formed in a trapezoidal shape.

In another further preferred embodiment, as the main body ascends or descends, the first guide link may be selectively moved in a longitudinal direction of the rail member due to the shape of the frame member.

In still another further preferred embodiment, the first guide link may include one end portion located in the rail member and another end portion bent toward the frame member so as to contact an inner surface of the frame member.

In yet another further preferred embodiment, each of the pair of side headrest units may be provided with a side coupling part including a first coupling portion to which the inner link is connected and a second coupling portion to which the outer link is connected.

In still yet another further preferred embodiment, the second coupling portion may include a guide slot formed therein to allow a rotating shaft of the outer link to be coupled thereto and to define a path along which the rotating shaft moves when the outer link is rotated by the inner link.

In a still further preferred embodiment, the device may further include a pair of speaker units respectively mounted in the pair of side headrest units to provide sound generated in a vehicle to an occupant.

In a yet still further preferred embodiment, the pair of speaker units may be configured to be activated when the pair of side headrest units is rotated so as to face each other.

Other aspects and preferred embodiments of the present device are discussed infra.

It is understood that the term "vehicle" or "vehicular" or other similar terms as used herein are inclusive of motor vehicles in general such as passenger automobiles including sport utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the present device are discussed infra.

BRIEF DESCRIPTION OF THE DRAWINGS

The above and other features of the present device will now be described in detail with reference to certain exemplary embodiments thereof illustrated in the accompanying drawings which are given hereinbelow by way of illustration only, and thus are not limitative of the present device, and wherein:

FIGS. 3, 4, and 6 to 8 are views showing the operational state of a side headrest unit of the vehicle headrest adjustment device according to the embodiment of the present disclosure;

FIGS. 9 to 13 are views showing initial position returning operation of the side headrest unit of the vehicle headrest adjustment device according to the embodiment of the present disclosure; and

4

Figure 14:
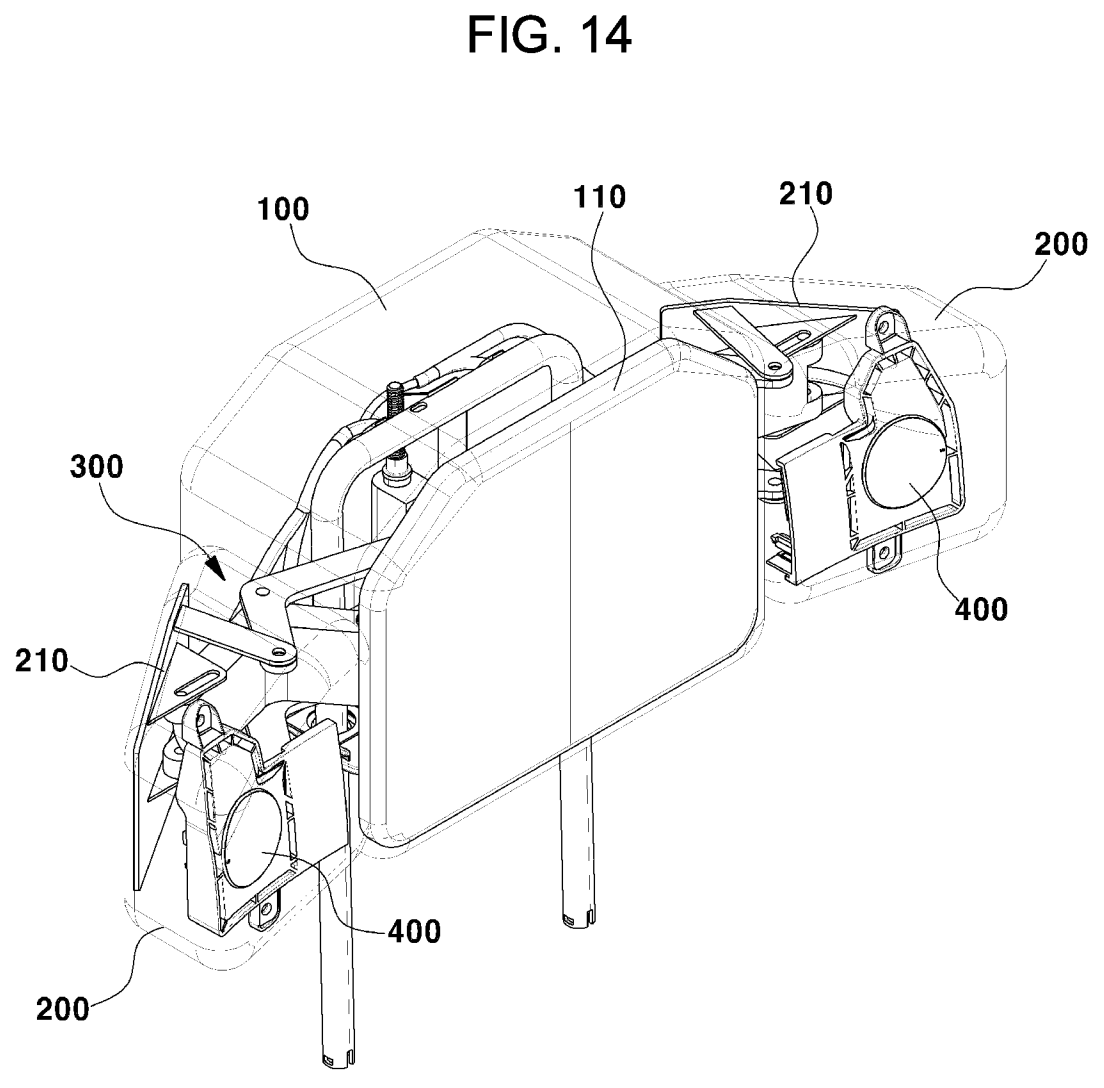
Figure 15:
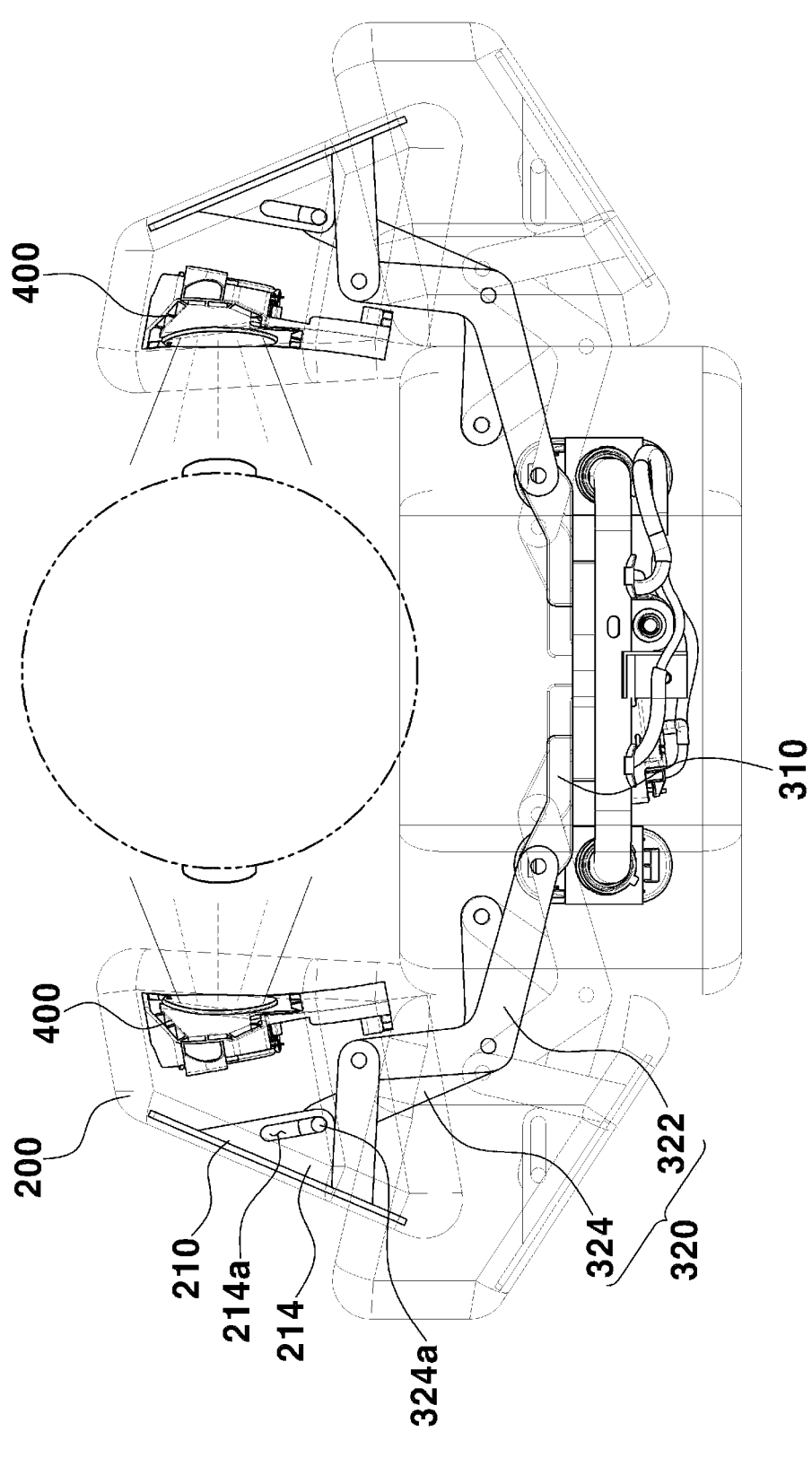

FIGS. 14 and 15 are views showing a speaker unit provided in the vehicle headrest adjustment device according to the embodiment of the present disclosure.

It should be understood that the appended drawings are not necessarily to scale, presenting a somewhat simplified representation of various preferred features illustrative of the basic principles of the device. The specific design features of the present device as disclosed herein, including, for example, specific dimensions, orientations, locations, and shapes, will be determined in part by the particular intended application and use environment.

In the figures, reference numbers refer to the same or equivalent parts of the present device throughout the several figures of the drawing.

DETAILED DESCRIPTION

Hereinafter, reference will now be made in detail to various embodiments of the present device, examples of which are illustrated in the accompanying drawings and described below.

Advantages and features of the present device and methods for achieving the same will be made clear from embodiments described below in detail with reference to the accompanying drawings.

The present device may, however, be embodied in many different forms, and should not be construed as being limited to the embodiments set forth herein. Rather, these embodiments are provided so that this disclosure will be thorough and complete, and will fully convey the scope of the device to those skilled in the art. The present device is defined only by the scope of the claims.

In the following description of the present device, a detailed description of known functions and configurations incorporated herein will be omitted when the same may make the subject matter of the present device rather unclear.

Figure 1:
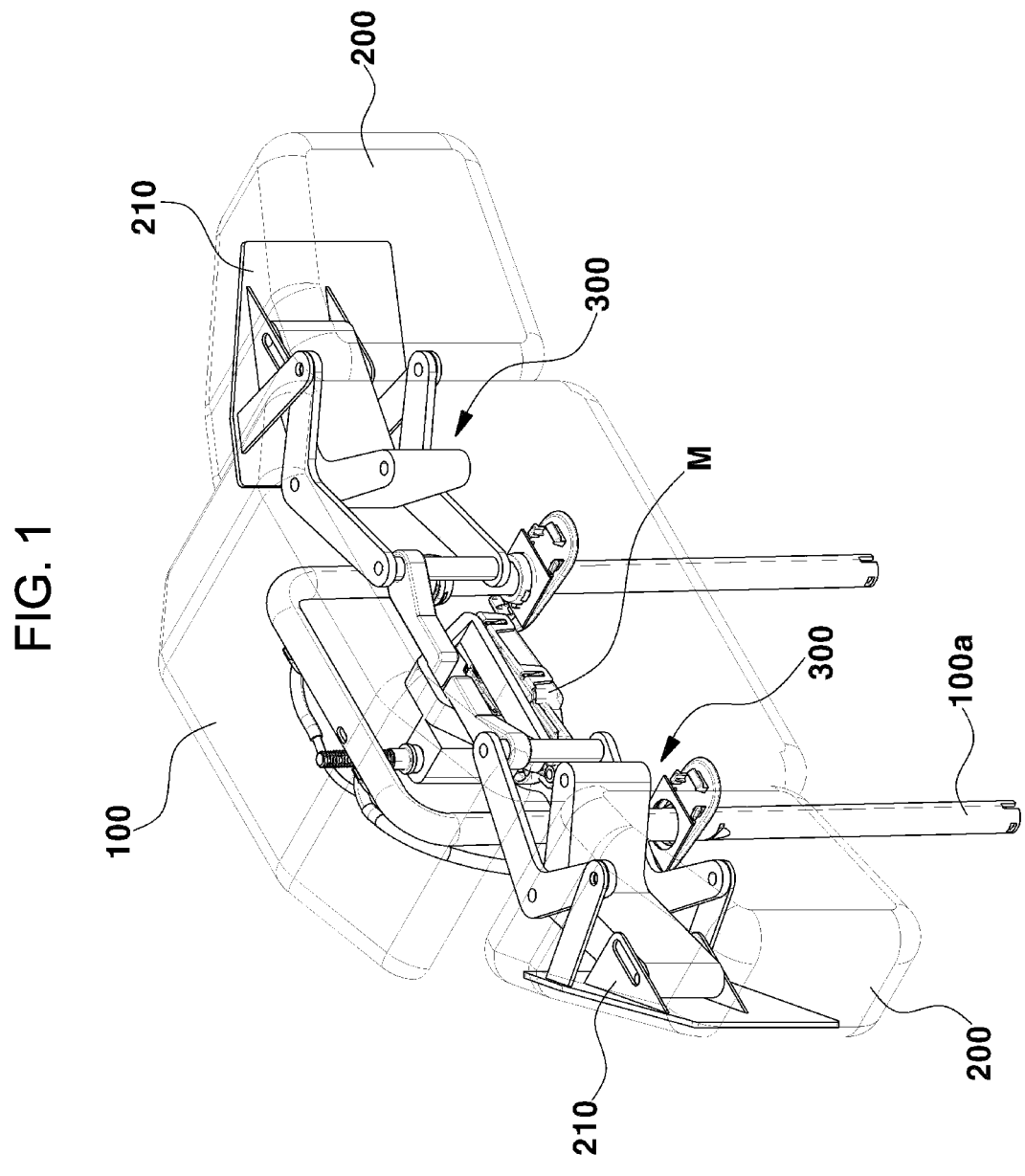
FIGS. 1 and 2 are views showing the structure of a vehicle headrest adjustment device according to an embodiment of the present disclosure.
Figure 2:
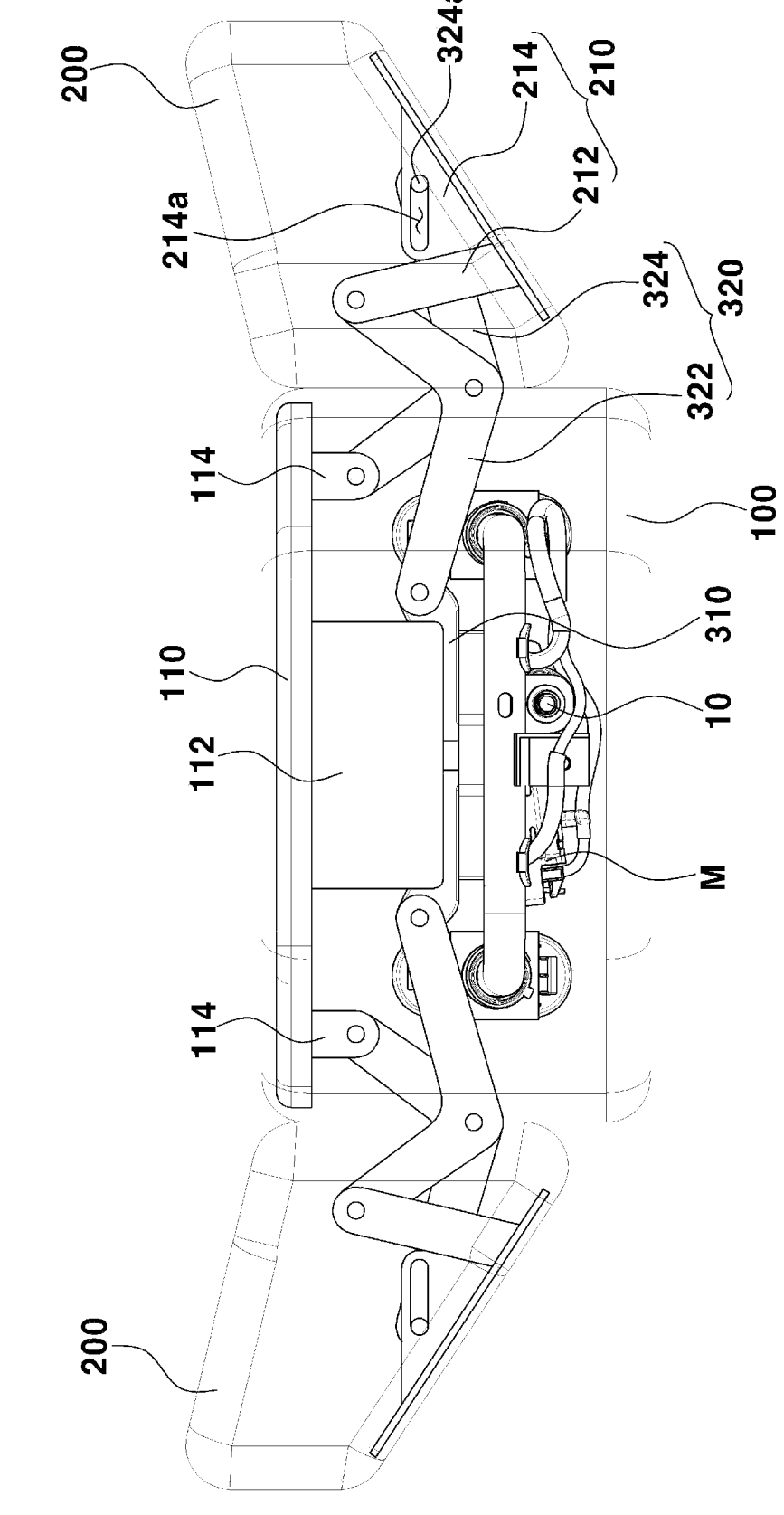

FIGS. 1 and 2 are views showing the structure of a vehicle headrest adjustment device according to an embodiment of the present device. FIGS. 3, 4, and 6 to 8 are views showing the operational state of a side headrest unit of the vehicle headrest adjustment device according to the embodiment of the present disclosure.

Figure 5A:
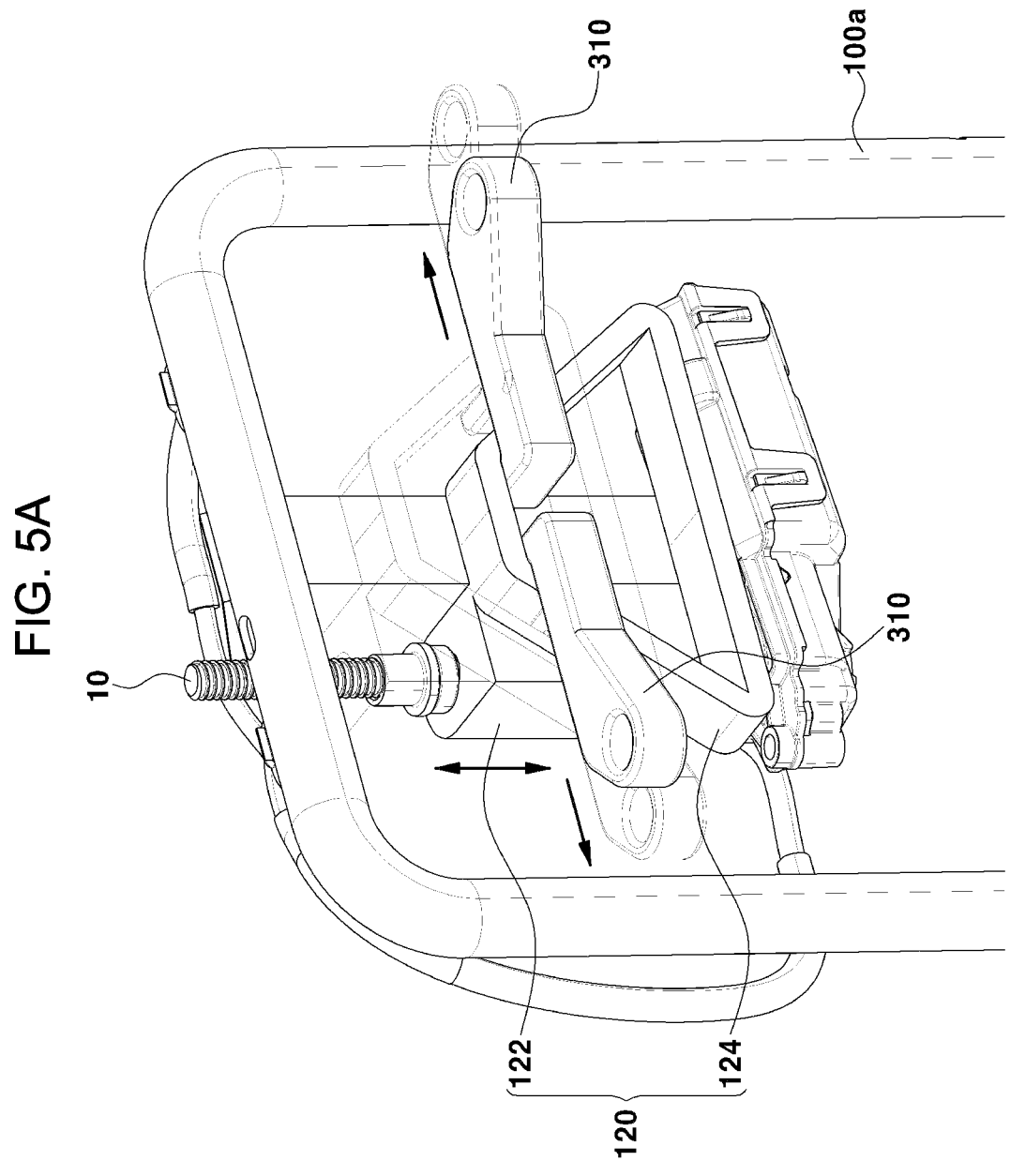
FIGS. 5A and 5B are views showing movement of a first guide link of the vehicle headrest adjustment device according to the embodiment of the present disclosure.
Figure 5B:
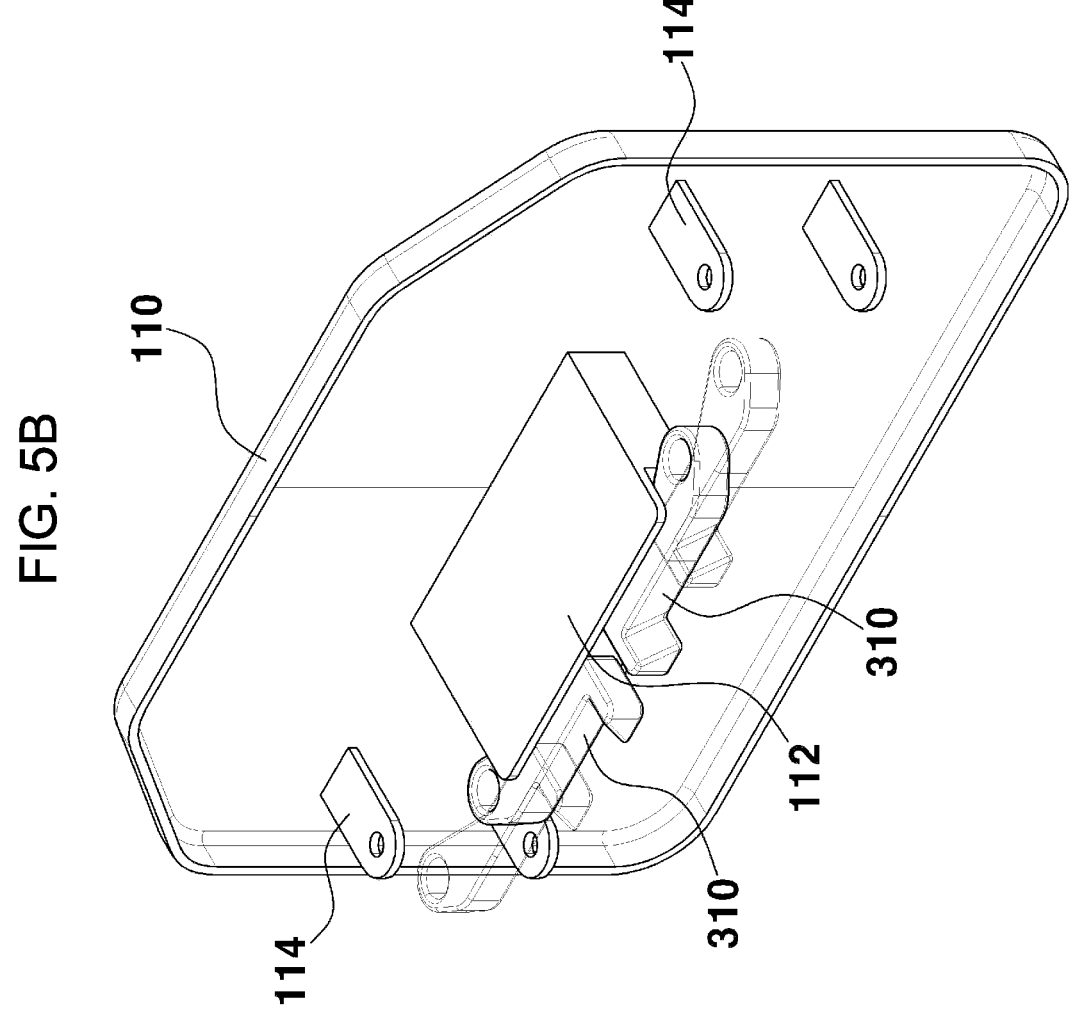

FIGS. 5A and 5B are views showing movement of a first guide link of the vehicle headrest adjustment device according to the embodiment of the present disclosure. FIGS. 9 to 13 are views showing initial position returning operation of the side headrest unit of the vehicle headrest adjustment device according to the embodiment of the present disclosure.

As shown in FIGS. 1 and 2, the vehicle headrest adjustment device according to the embodiment includes a headrest unit 100, a side headrest unit 200, and a link unit 300.

The headrest unit 100 includes a driving unit M, and is connected to a vehicle seat via a connecting member 100a.

The headrest unit 100 includes a center coupling part 110 and a lifting guide 120.

The center coupling part 110 is provided with a rail member 112 to guide movement of a first guide link 310, which will be described later, and is provided on both sides thereof with coupling members 114, each of which is formed to allow one end of an outer link 324 to be rotatably connected thereto (refer to FIG. 5B).

The lifting guide 120 is coupled to a lead screw 10 of the driving unit M. As the lead screw 10 rotates, the lifting guide 120 ascends or descends to guide the first guide link 310 to move in the width direction of the headrest unit 100 within the rail member 112.

Preferably, the lifting guide 120 may include a main body 122 and a frame member 124 in order to guide movement of the first guide link 310.

As shown in FIG. 5A, the main body 122 is threadedly engaged with the lead screw 10 so as to ascend or descend in the longitudinal direction of the lead screw 10 when the driving unit M is driven.

In addition, referring to FIG. 5A, the frame member 124 is mounted to the main body 122, and is formed in a trapezoidal shape.

Due to the trapezoidal shape of the frame member 124, which is gradually narrowed in an upward direction, the first guide link 310 may selectively move in the longitudinal direction of the rail member 112 as the main body 122 ascends or descends along with rotation of the lead screw 10.

To this end, the first guide link 310 includes one end portion located so as to be movable within the rail member 112 and another end portion bent toward the frame member 124 so as to contact an inner surface of the frame member 124 (refer to FIG. 5B). Accordingly, as the frame member 124 ascends or descends, the first guide link 310 moves in the width direction of the headrest unit 100 within the rail member 112 due to the other end portion thereof contacting the inner surface of the trapezoidal frame member 124 (refer to the arrow direction in FIG. 5A).

The side headrest unit 200 is provided in a pair. The pair of side headrest units 200 is disposed on the left and right sides of the headrest unit 100, respectively, and is provided to be rotated selectively by the link unit 300.

The side headrest unit 200 may be provided with a side coupling part 210, which includes a first coupling portion 212 to which an inner link 322 is connected and a second coupling portion 214 to which an outer link 324 is connected.

The first coupling portion 212 and the second coupling portion 214 are formed in directions intersecting each other, and the inner link 322 and a rotating shaft 324a of the outer link 324 are connected to the first coupling portion 212 and the second coupling portion 214, respectively.

Preferably, the second coupling portion 214 may include a guide slot 214a formed therein to define a moving path along which the rotating shaft 324a moves when the outer link 324 is rotated by the inner link 322. Accordingly, the pair of side headrest units 200 may perform rotational movement. In detail, the pair of side headrest units 200 may be rotated forward so as to face each other or may be returned to initial positions thereof (refer to FIGS. 9 and 15).

The link unit 300 is provided to connect the headrest unit 100 to each of the pair of side headrest units 200. As the driving unit M is driven, the link unit 300 operates so that each of the pair of side headrest units 200 is rotated with respect to the headrest unit 100 to a desired angle within a predetermined rotation adjustment range.

To this end, the link unit 300 includes a first guide link 310 and a second guide link 320.

As the driving unit M is driven, the first guide link 310 moves in the width direction of the headrest unit 100, that is, in the longitudinal direction thereof, within the rail member 112 provided at the center coupling part 110.

Since this movement of the first guide link 310 has been described above along with the description of the configuration of the headrest unit 100, a detailed description thereof will be omitted.

In addition, as the first guide link 310 moves, the inner link 322 and the outer link 324 of the second guide link 320 continuously rotate to guide each of the pair of side headrest units 200 to rotate forward from the initial position thereof such that the pair of side headrest units 200 faces each other.

Here, the inner link 322 rotates along with movement of the first guide link 310, and is bent in an L-shape so as to be connected to the side headrest unit 200.

In other words, one end portion of the inner link 322 extends from the bent portion of the inner link 322 so as to be connected to the first guide link 310, and the other end portion of the inner link 322 extends from the bent portion of the inner link 322 so as to be connected to the first coupling portion 212 of the side coupling part 210 provided in the side headrest unit 200.

Further, the outer link 324 has the same shape as the inner link 322, and the bent portion of the outer link 324 and the bent portion of the inner link 322 are axially coupled to each other such that the outer link 324 and the inner link 322 cross each other. The outer link 324 is rotated by the inner link 322, and connects the side headrest unit 200 to the headrest unit 100.

In detail, in the state in which the bent portion of the outer link 324 and the bent portion of the inner link 322 are axially coupled to each other, one end portion of the outer link 324 extending from the bent portion is rotatably connected to the coupling member 114 of the center coupling part 110 (refer to FIG. 5B), and the other end portion of the outer link 324 extending from the bent portion is connected to the second coupling portion 214 of the side coupling part 210 provided in the side headrest unit 200.

Preferably, the inner link 322 is formed such that one end portion thereof extending from the bent portion thereof to be connected to the first guide link 310 is longer than the other end portion thereof extending from the bent portion thereof, and the outer link 324 is formed such that one end portion thereof extending from the bent portion thereof to be connected to the coupling member 114 is shorter than the other end portion thereof extending from the bent portion thereof.

As the first guide link 310 moves, the inner link 322 and the outer link 324 rotate in opposite directions about respective bent portions thereof. Accordingly, the inner link 322 functions to enable the side headrest unit 200 to rotate forward or backward to a desired angle, and at the same time, the outer link 324 functions to enable the side headrest unit 200 to continuously rotate.

Hereinafter, based on the above-described configuration of the device for adjusting a headrest for vehicles according to the embodiment, operation for rotating the pair of side headrest units 200 such that the pair of side headrest units 200 faces each other will be described with reference to FIGS. 3 to 8.

Figure 3:
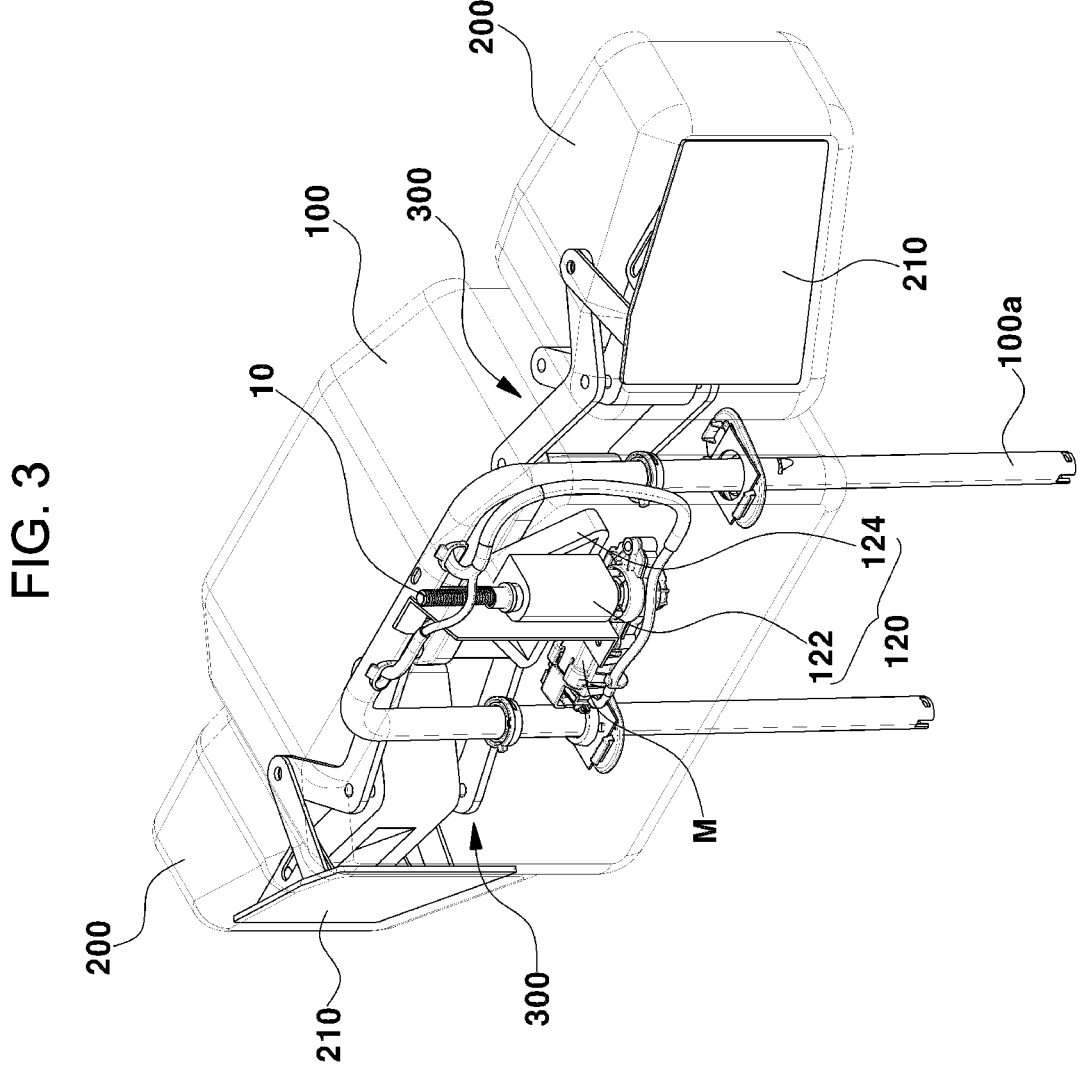

First, as shown in FIG. 3, when the driving unit M is driven in order to rotate the pair of side headrest units 200, the lead screw 10 rotates clockwise, and the main body 122 coupled to the lead screw 10 ascends vertically.

Figure 4:
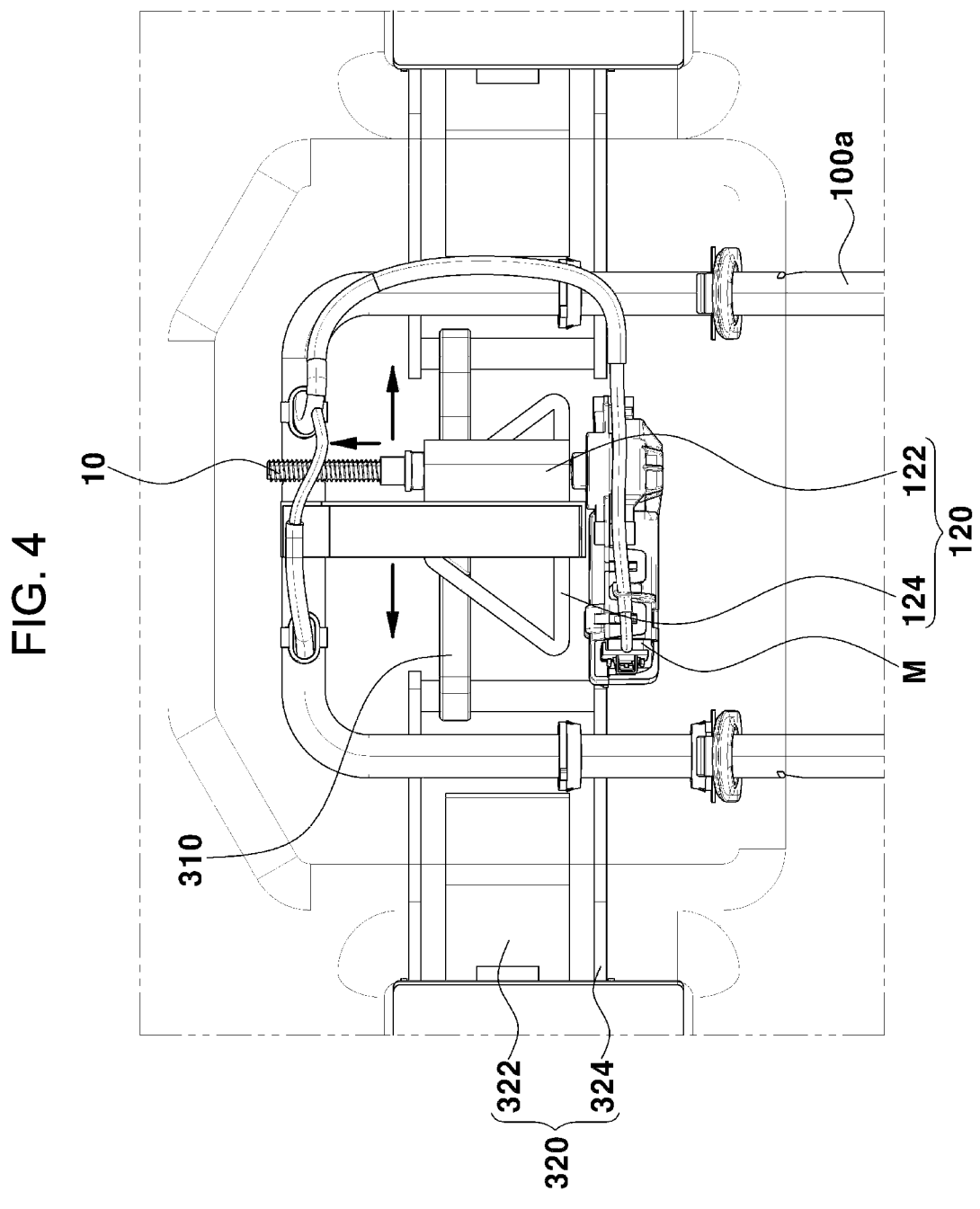

As the main body 122 ascends, the first guide links 310 move away from each other, as indicated by the arrows in FIG. 4. In detail, the first guide links 310 move away from each other while moving along the inner surface of the trapezoidal frame member 124 from an upper portion of the frame member 124 to a lower portion of the frame member 124 (refer to FIG. 5A).

Figure 6:
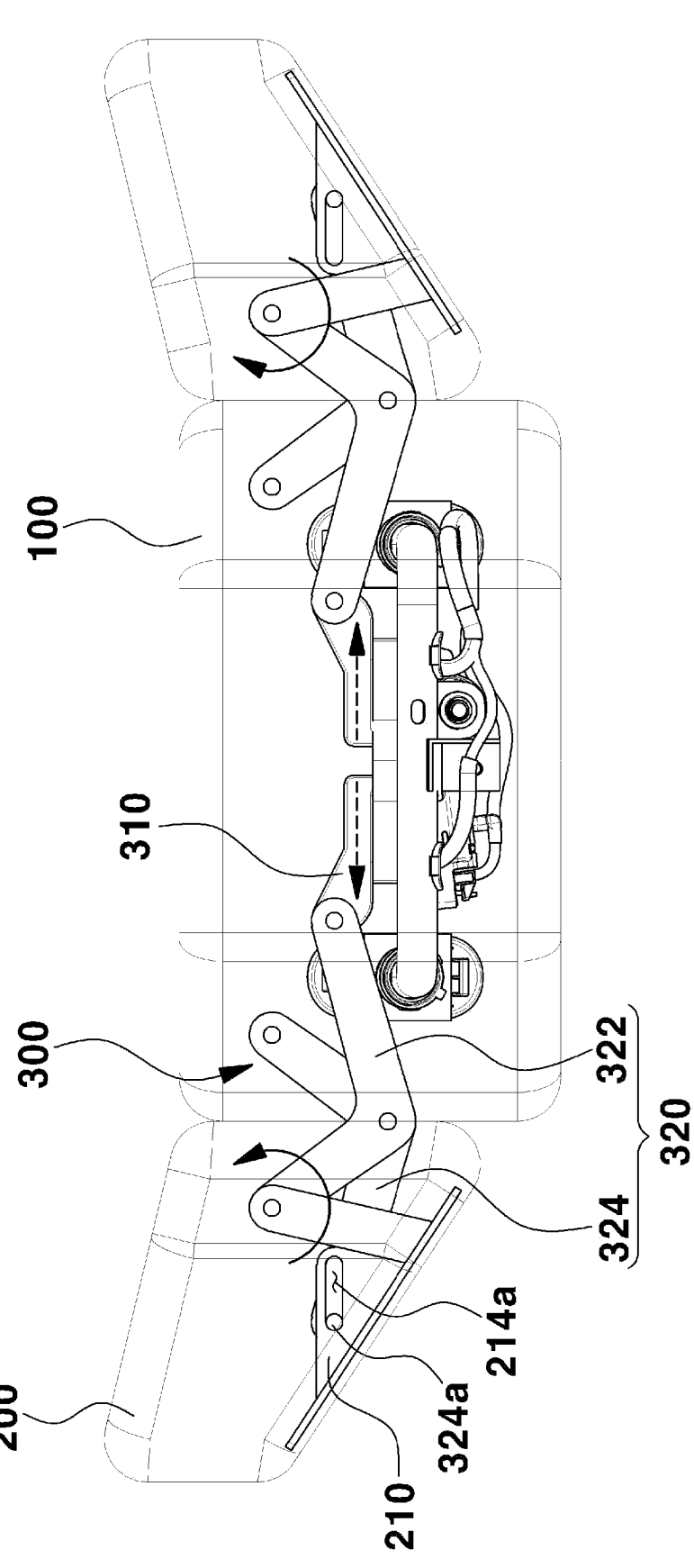
Figure 7:
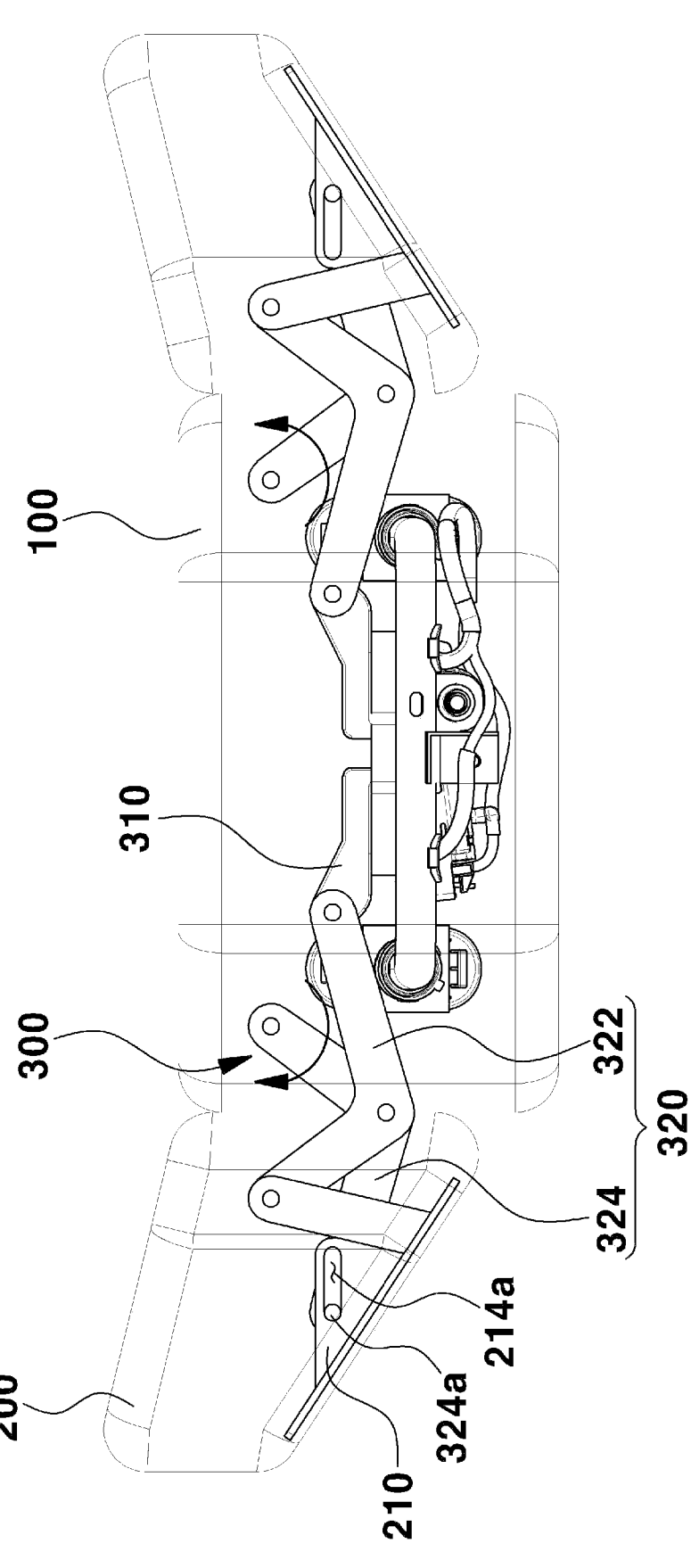

Among the link units 300 disposed on the left and right sides of the headrest unit 100, operation of the link unit 300 disposed on the left side will now be described. Along with this movement of the first guide links 310, the other end portion of the inner link 322 connected to the side headrest unit 200 rotates counterclockwise, as shown in FIG. 6. At the same time, as shown in FIG. 7, the outer link 324, the bent portion of which is axially coupled to the bent portion of the inner link 322 such that the outer link 324 and the inner link 322 cross each other, is pushed and rotates clockwise about one end portion thereof coupled to the coupling member 114.

Figure 8:
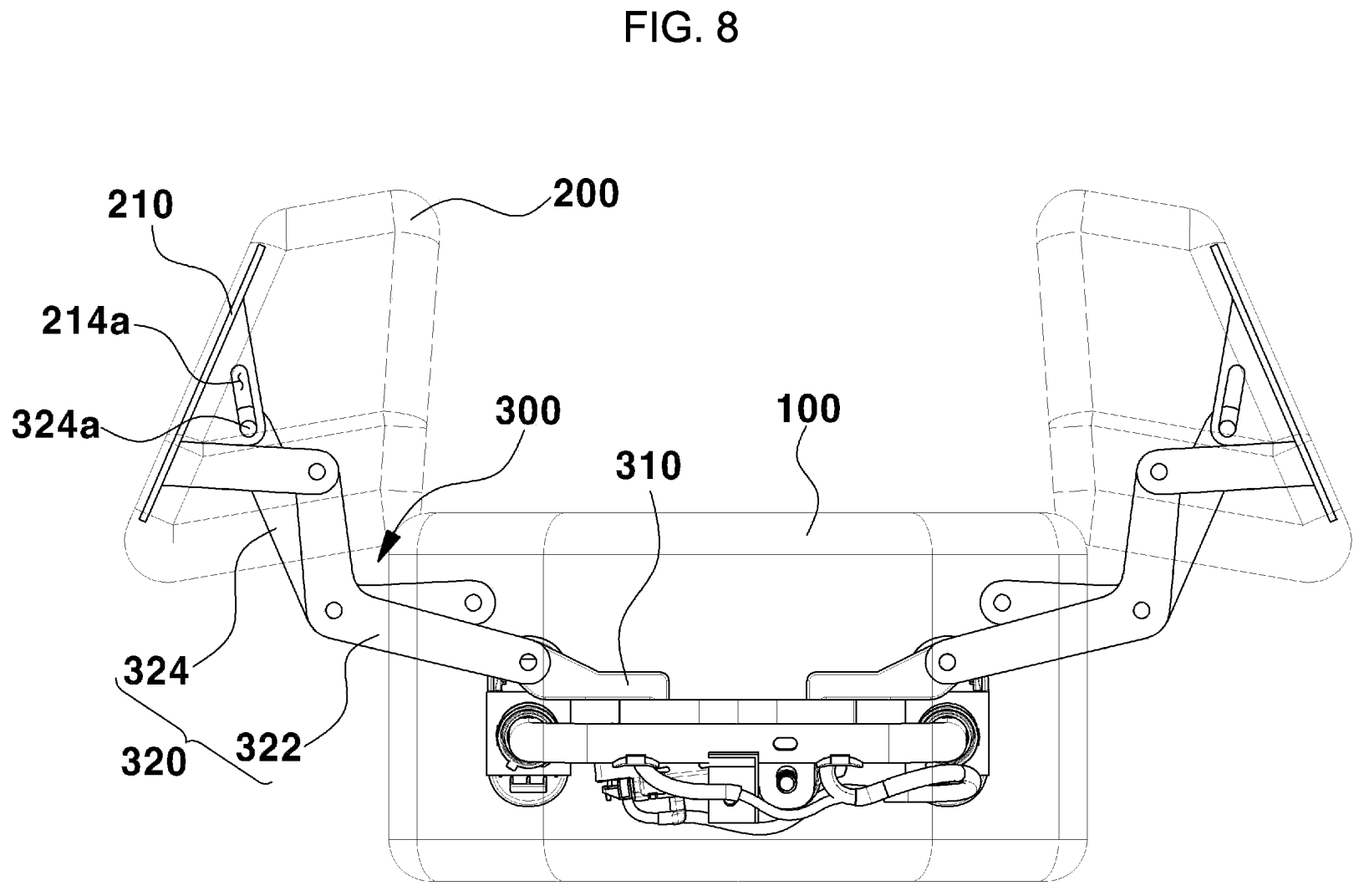

In this way, the pair of side headrest units 200 is rotated to positions where the same supports an occupant's head. In this case, as shown in FIG. 8, the rotating shaft 324*a* of the outer link 324 moves along the guide slot 214*a* in the longitudinal direction of the guide slot 214*a*. As a result, each of the pair of side headrest units 200 is rotated to a desired angle within the predetermined rotation adjustment range.

Hereinafter, based on the above-described configuration of the device for adjusting a headrest for vehicles according to the embodiment, operation for returning the pair of side headrest units 200 to the initial positions thereof will be described with reference to FIGS. 9 to 13.

Figure 9:
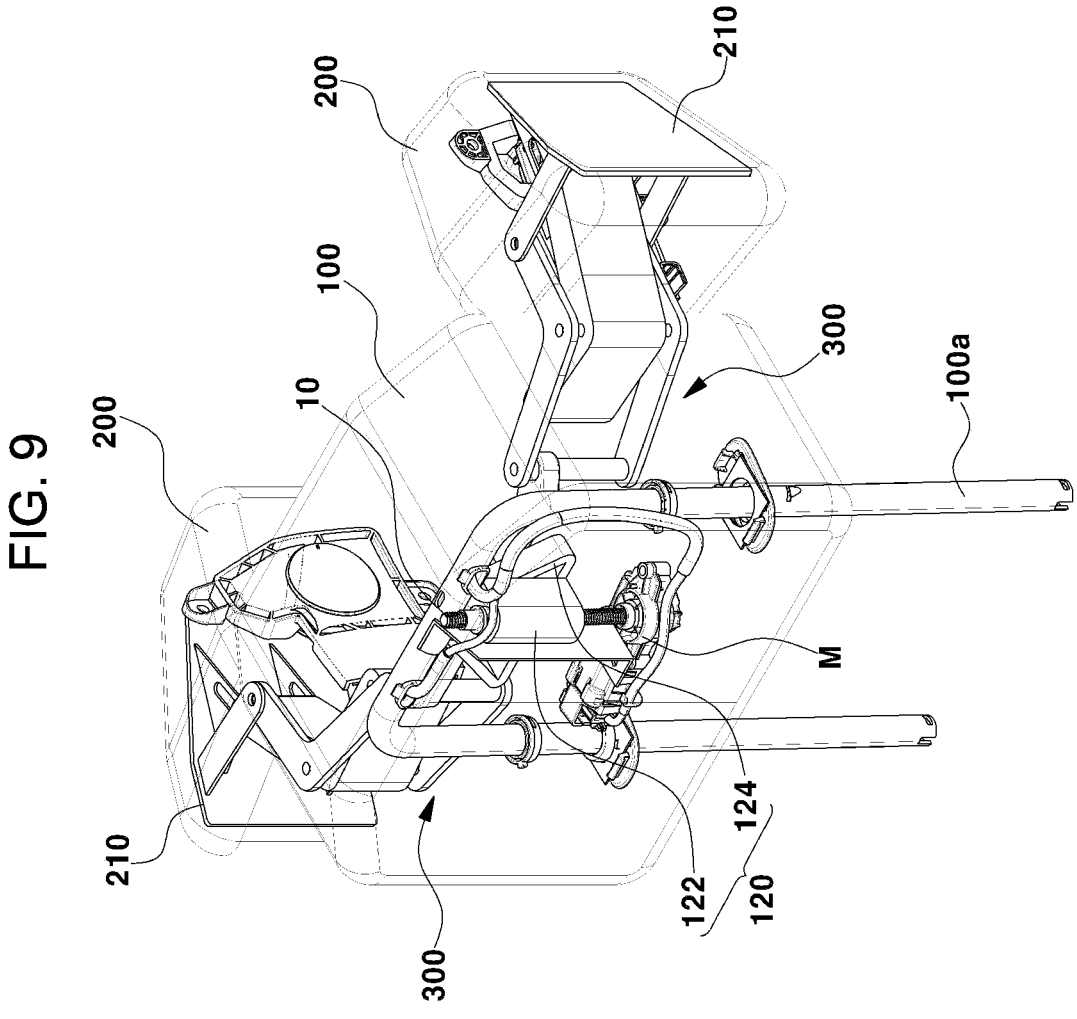

In the state in which each of the pair of side headrest units 200 is rotated to a desired angle within the predetermined rotation adjustment range, as shown in FIG. 9, when the driving unit M is driven in order to rotate the pair of side headrest units 200, the lead screw 10 rotates counterclockwise, and the main body 122 coupled to the lead screw 10 descends vertically.

Figure 10:
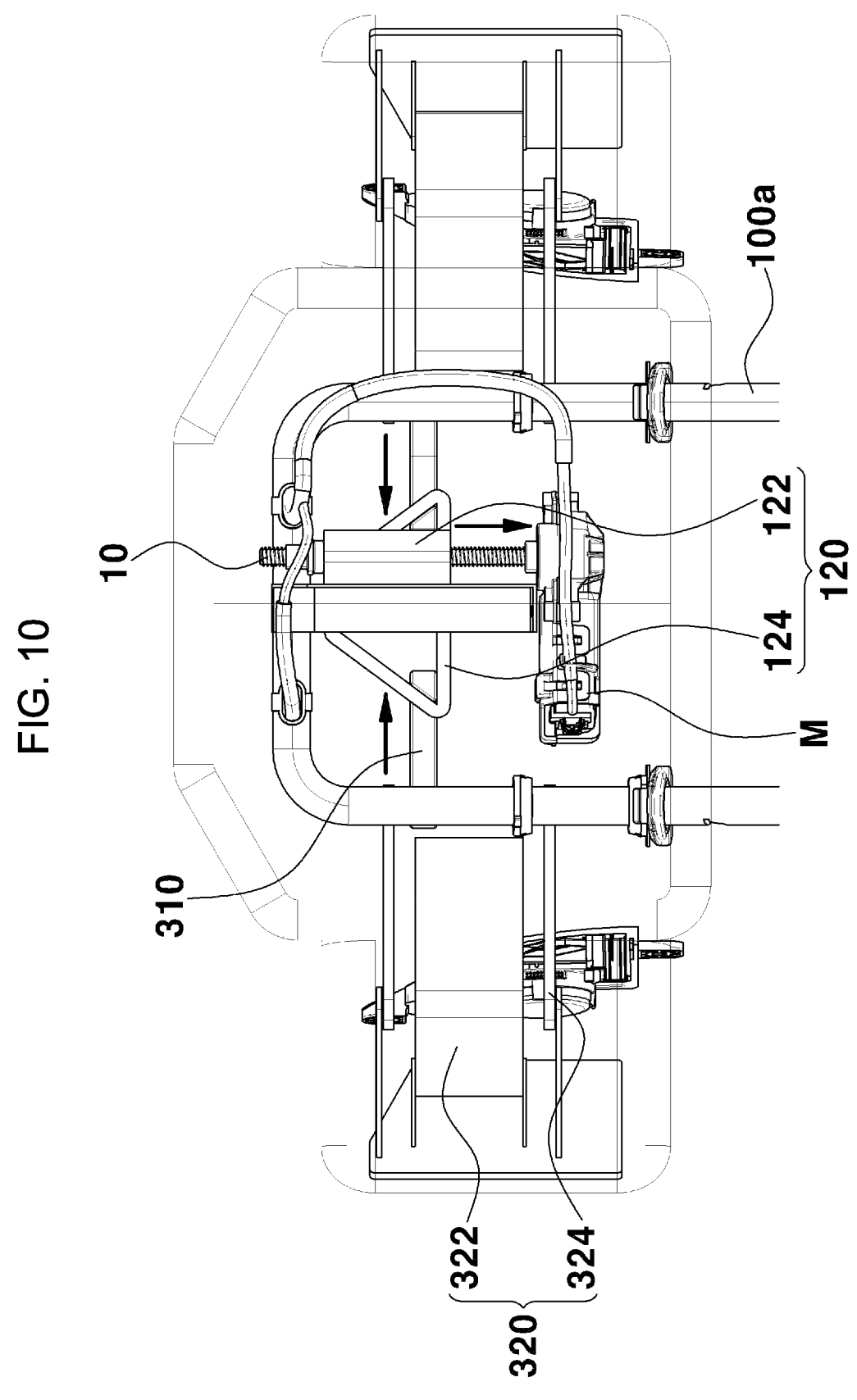

As the main body 122 descends, the first guide links 310 move to the initial positions thereof, as indicated by the arrows in FIG. 10. In detail, the first guide links 310 move toward each other while moving along the inner surface of the trapezoidal frame member 124 from the lower portion of the frame member 124 to the upper portion of the frame member 124.

Figure 11:
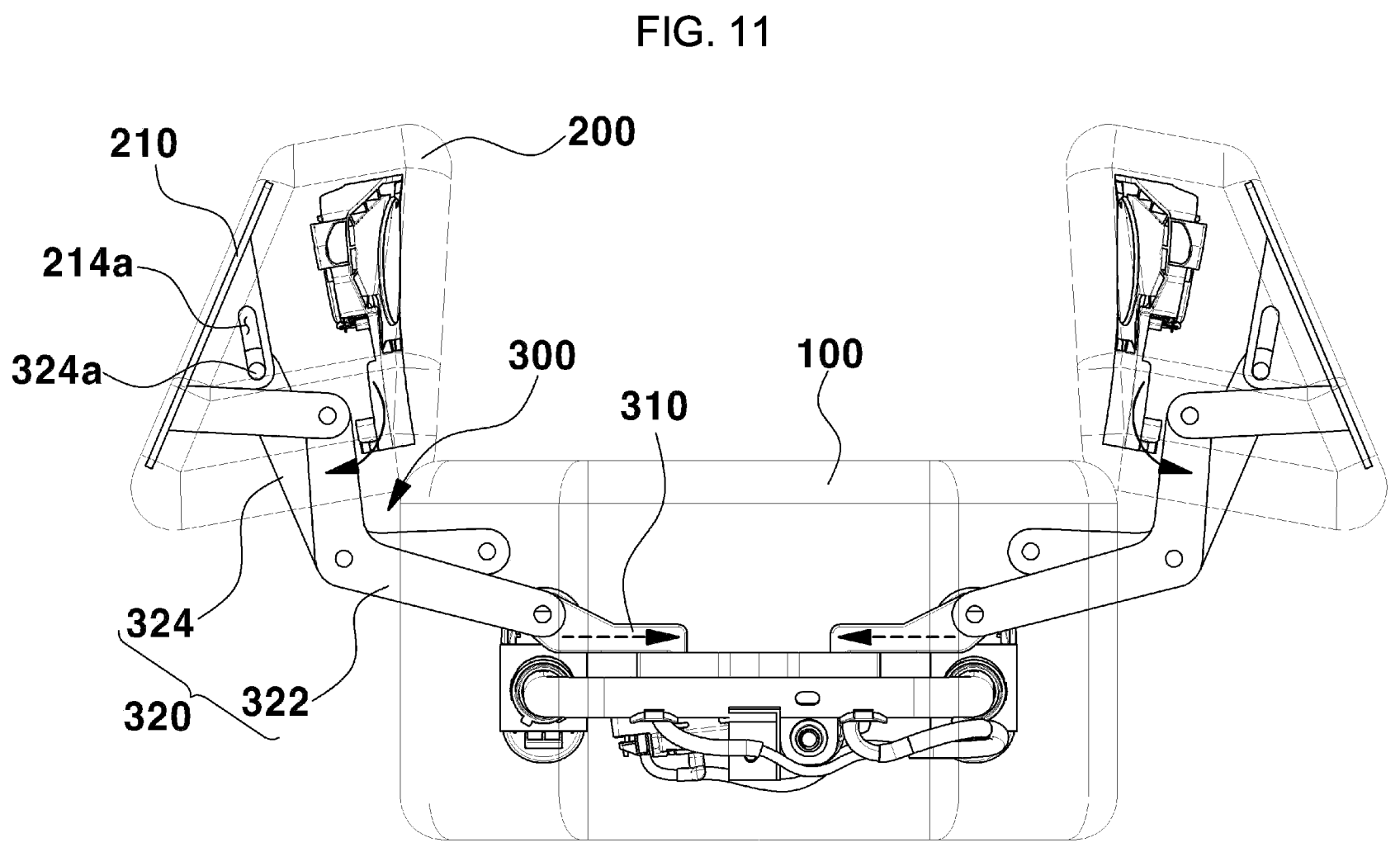
Figure 12:
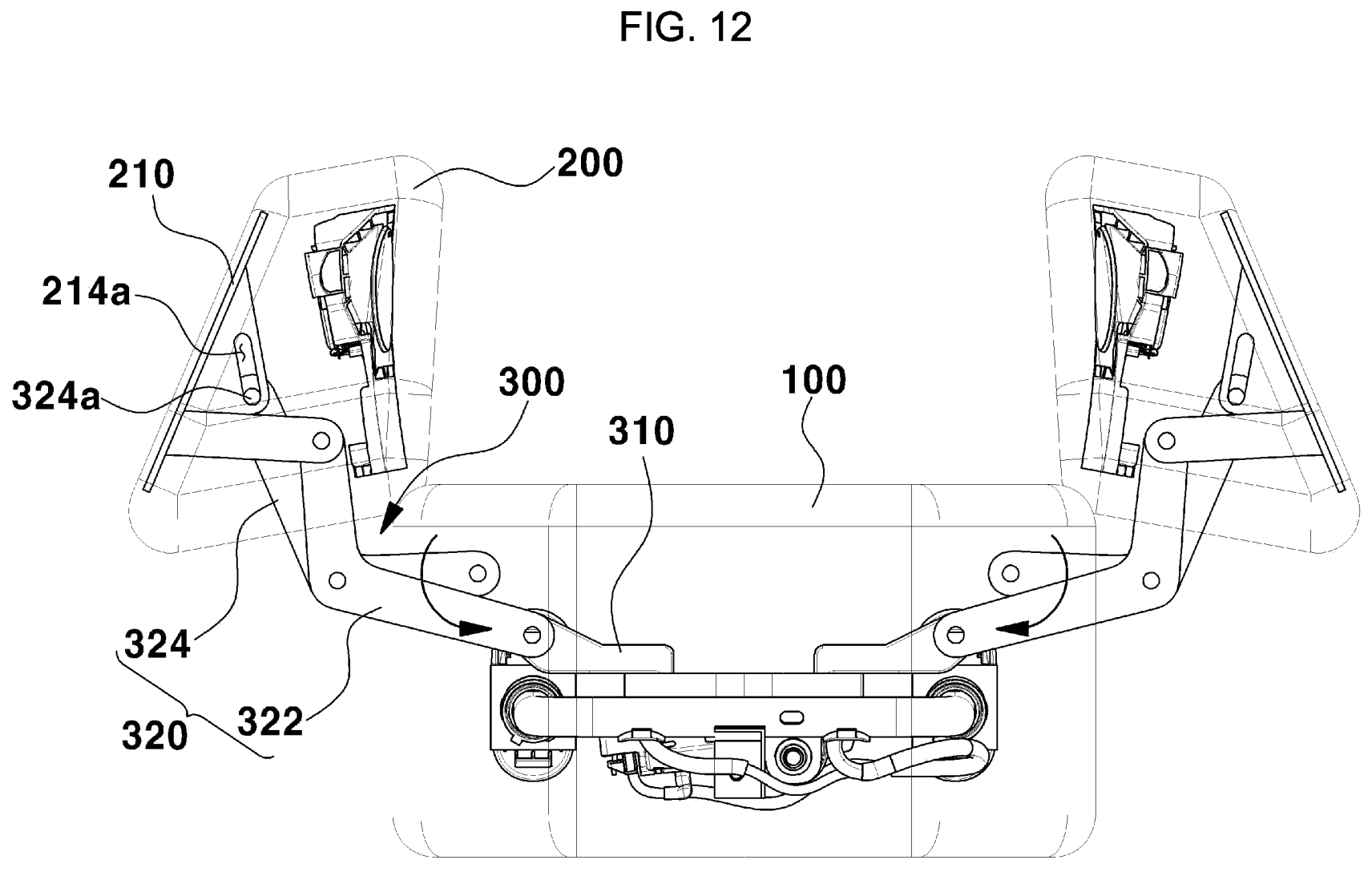

Among the link units 300 disposed on the left and right sides of the headrest unit 100, operation of the link unit 300 disposed on the left side will now be described. Along with this movement of the first guide links 310, the other end portion of the inner link 322 connected to the side headrest unit 200 rotates clockwise, as shown in FIG. 11. At the same time, as shown in FIG. 12, the outer link 324, the bent portion of which is axially coupled to the bent portion of the inner link 322 such that the outer link 324 and the inner link 322 cross each other, is pulled and rotates counterclockwise about one end portion thereof coupled to the coupling member 114.

Figure 13:
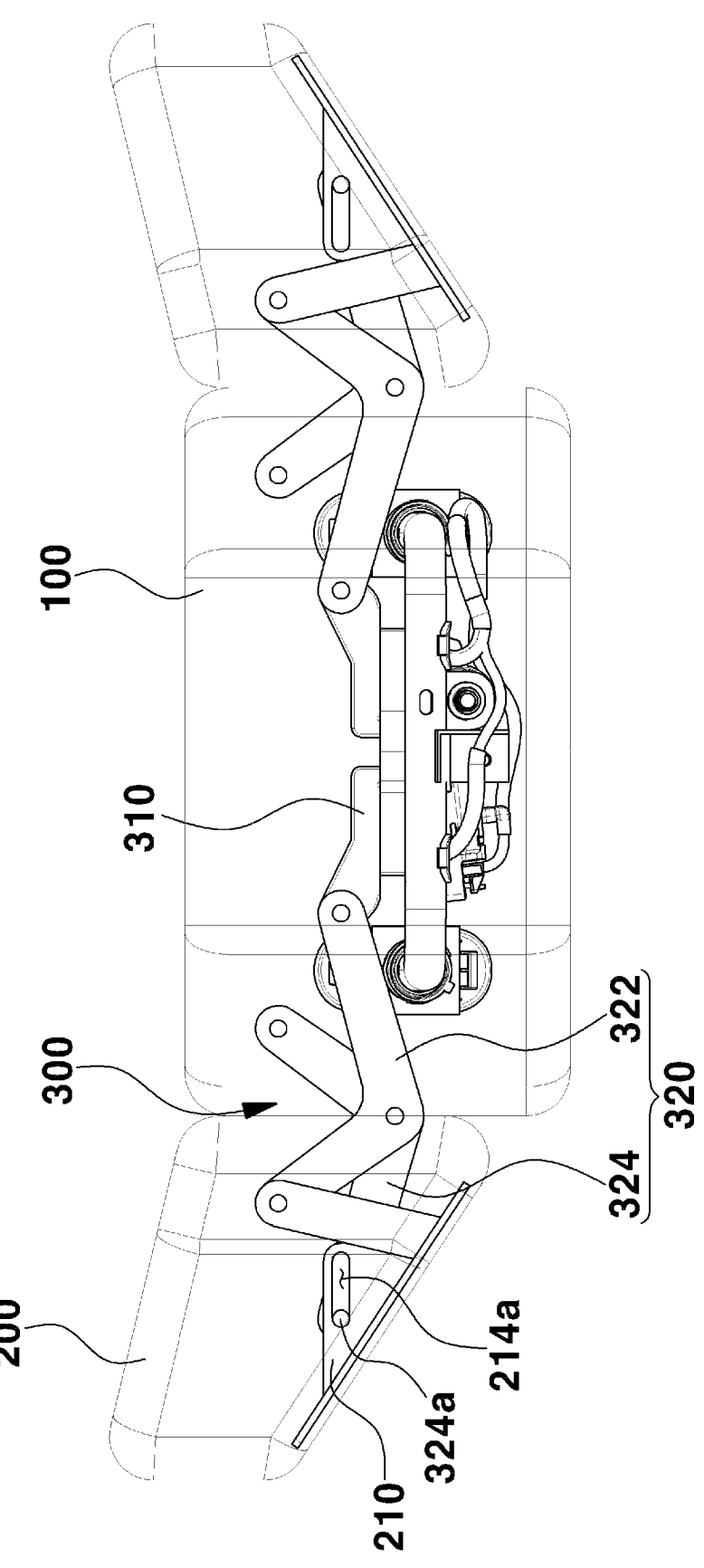

In this way, the pair of side headrest units 200 is rotated to the initial positions thereof. In this case, as shown in FIG. 13, the rotating shaft 324*a* of the outer link 324 moves along the guide slot 214*a* in the longitudinal direction of the guide slot 214*a*. As a result, the pair of side headrest units 200 is returned to the initial positions thereof within the predetermined rotation adjustment range.

FIGS. 14 and 15 are views showing a speaker unit provided in the vehicle headrest adjustment device according to the embodiment of the present device.

The device for adjusting a headrest for vehicles according to the embodiment may further include a speaker unit 400.

The speaker unit 400 is provided in a pair, and the pair of speaker units 400 is mounted on front surfaces of the pair of side headrest units 200, respectively. Such a speaker unit 400 is formed so as to provide sound generated in the vehicle, for example, music or audio navigation information, to an occupant.

Preferably, in order to effectively provide sound to an occupant, the pair of speaker units 400 may be configured to be selectively activated when the pair of side headrest units is rotated so as to face each other, as shown in FIG. 15.

As is apparent from the above description, the device for adjusting a headrest for vehicles according to the embodiment is equipped with a pair of link mechanisms configured to be adjusted in coupling angle by operation of a driving motor connected thereto, thereby selectively rotating side headrests connected to left and right sides of a headrest to a desired angle within a predetermined rotation adjustment range, thus reliably supporting an occupant's head and providing comfortable seating feeling to the occupant.

In addition, since the device for adjusting a headrest for vehicles according to the embodiment is equipped with speakers respectively provided in the side headrests, it is possible to more effectively provide sound generated in a vehicle to the occupant when the side headrests are rotated so as to face the occupant within the predetermined rotation adjustment range.

Although exemplary embodiments of the present device have been disclosed for illustrative purposes, those skilled in the art will appreciate that various changes may be made without departing from the principles and spirit of the device and that all or part of the embodiments described above may be selectively combined so as to be modified into various forms. Accordingly, the technical protection scope of the present device should be understood to be limited only by the technical idea of the appended claims.

What is claimed is:

1. A device for adjusting a headrest for vehicles, the device comprising:

a headrest unit disposed on the vehicle seat and comprising a driving unit;

a pair of side headrest units disposed on left and right sides of the headrest unit, respectively, and configured to be selectively rotated; and a pair of link units configured to respectively connect the pair of side headrest units to the headrest unit and to be operated by the driving unit to rotate the pair of side headrest units within a predetermined rotation adjustment range with respect to the headrest unit, wherein each of the pair of link units comprises:

a first guide link configured to move in width directions of the headrest unit when the driving unit is driven; and a second guide link configured to continuously rotate based on movement of the first guide link to guide a corresponding one of the pair of side headrest units to be rotated from an initial position thereof and to face a remaining one of the pair of side headrest units, wherein the second guide link comprises:

an inner link configured to rotate based on the movement of the first guide link and comprising a first bent portion bent in a first L-shape so as to be connected to the corresponding one of the pair of side headrest units; and an outer link comprising a second bent portion bent in a second L-shape to connect the corresponding one of the pair of side headrest units to the headrest unit, wherein the second bent portion of the outer link and the first bent portion of the inner link are axially coupled to each other such that the outer link and the inner link are coupled with each other at an overlapping portion and the outer link is rotated by the inner link.

2. The device of claim 1, wherein the inner link comprises a first end portion extending from the first bent portion so as to be connected to the first guide link and a second end portion extending from the first bent portion, the first end portion of the inner link having a longer length from the first bent portion than the second end portion of the inner link, and wherein the outer link comprises a first end portion extending from the second bent portion so as to be connected to the headrest unit and a second end portion extending from the second bent portion, the first end portion of the outer link having a shorter length from the second bent portion than the second end portion of the outer link.

3. The device of claim 1, wherein, as the first guide link moves, the inner link and the outer link of the second guide link rotate in opposite directions about the respective bent portions thereof.

4. The device of claim 1, wherein the headrest unit comprises:

a center coupling part provided with a rail member to guide movement of the first guide link and configured to allow one end of the outer link of the second guide link to be rotatably connected thereto; and a lifting guide configured to ascend or descend based on rotation of a lead screw provided at the driving unit to guide the first guide link to move in the width direction of the headrest unit.

5. The device of claim 4, wherein the lifting guide comprises:

a main body coupled to the lead screw so as to ascend and descend; and a frame member mounted to the main body and formed in a trapezoidal shape.

6. The device of claim 5, wherein, as the main body is moved to ascend or descend, the first guide link is configured to be selectively moved in longitudinal directions of the rail member due to the shape of the frame member.

7. The device of claim 6, wherein the first guide link comprises one end portion located in the rail member and another end portion bent toward the frame member so as to contact an inner surface of the frame member.

8. The device of claim 1, wherein each of the pair of side headrest units is provided with a side coupling part comprising a first coupling portion to which the inner link is connected and a second coupling portion to which the outer link is connected.

9. The device of claim 8, wherein the second coupling portion comprises a guide slot formed therein to allow a rotating shaft of the outer link to be coupled thereto and to define a path along which the rotating shaft moves when the outer link is rotated by the inner link.

10. The device of claim 1, further comprising a pair of speaker units mounted in the pair of side headrest units respectively to provide sound generated in a vehicle to an occupant.

11. The device of claim 10, wherein the pair of speaker units are configured to be turned on when the pair of side headrest units are rotated so as to face each other.

\* \* \* \* \*